Patented June 21, 1949

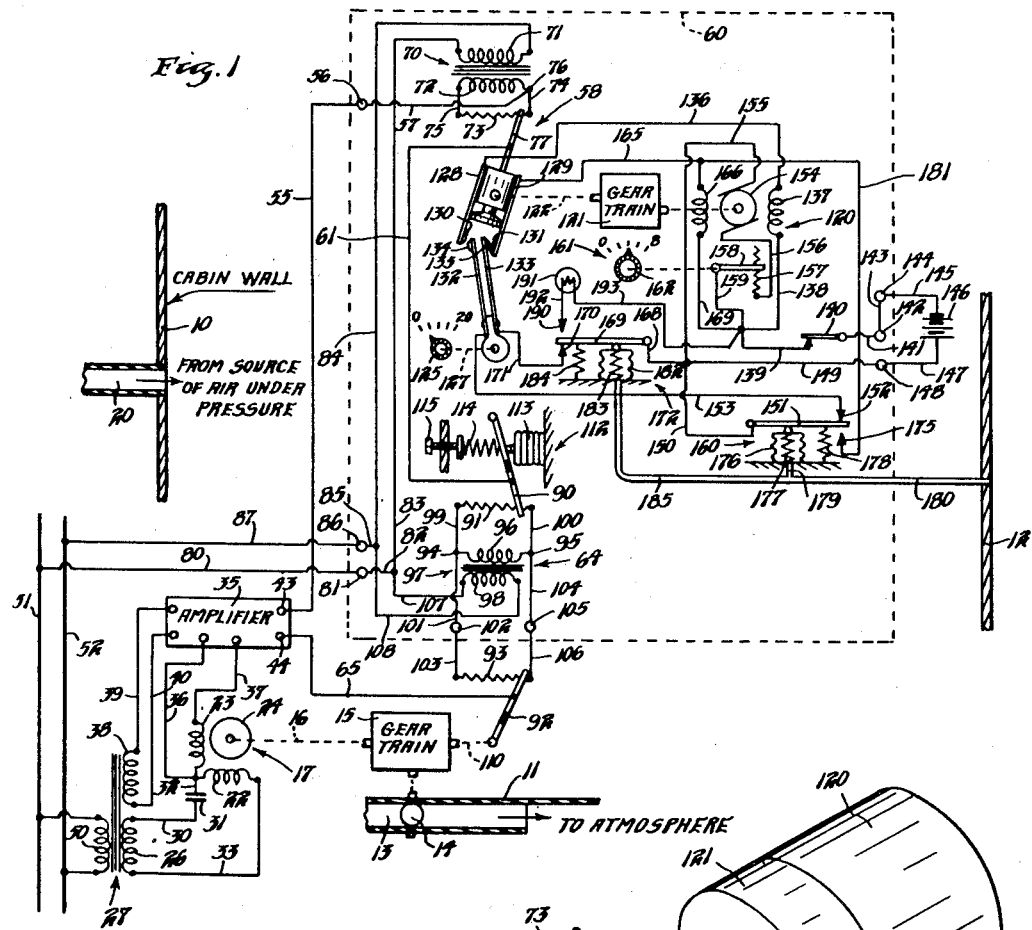

2,473,776

UNITED STATES PATENT OFFICE 2,473,776

PRESSURE CONTROL APPARATUS

Albert E. Baak, Los Angeles, Calif., assignor to Minneapolis-Honeywell Regulator Company, Minneapolis, Minn., a corporation of Delaware Application June 22, 1944, Serial No. 541,583

15 Claims. (Cl. 98—1.5)

The present invention relates to means controlling the air pressure within the supercharged cabin of an aircraft.

To make high altitude flying commercially feasible, it has been found necessary to maintain the air pressure inside the cabin of the aircraft within predetermined limits. Various means have been provided to supply air under pressure to the cabin, such as using an auxiliary blower, to diverting to the cabin a portion of the air compressed by a turbo supercharger associated with one of the aircraft engines. This latter method of furnishing air to the cabin has a considerable weight advantage over other systems, but it may increase the difficulty of controlling the cabin pressure.

In military flying, the problems of cabin pressure control are increased in spite of the availability of oxygen masks and the like. To minimize the time during which the masks must be worn, it is found desirable to operate with a pressurized cabin until the combat area is reached at which time the masks may be put on and the cabin pressure reduced. In both military and commercial airplanes, one of the principal problems associated with cabin pressure control is the control of the rate of change in said pressure. Human beings can adjust themselves to certain amounts of change in atmospheric pressure, but if these changes be made too rapidly, discomfort, and possibly danger, result. Thus it appears that the benefits of cabin supercharging cannot be fully utilized unless changes in pressure are at a low enough rate to permit the human beings within the cabin to adjust themselves to the changing pressure. Further, by good control of the pressure in the cabin, a wider range of pressure may be tolerated.

It is therefore an object of this invention to provide improved means for controlling the air pressure within an aircraft cabin.

It is a further object to control the air pressure within an aircraft cabin supplied with ventilating air under pressure by controllably throttling its exit from said cabin.

So that full advantage may be taken of the benefits of cabin pressurizing, it is also an object to control the rate of change of air pressure within a pressurized aircraft cabin. This is accomplished by adjustably controlling the rate of effective adjustment of the cabin pressure control means.

More generally, it is an object to provide means to adjust a potentiometer to a predetermined point at a predetermined rate by adjusting same with a motor having an adjustable speed.

Because of the difficulty of controlling air flow as the differential of pressure existing between the cabin and atmosphere approaches zero, and to prevent an irregular schedule of climbing or descending the aircraft from interfering with the rate of pressure change within the cabin, it is also an object to provide differential pressure control means which will suspend the action of the pressure changing devices as the differential pressure approaches zero.

Further, the amount of pressure difference that can be safely imposed on the aircraft structure is limited. Therefore it is also an object to provide cabin pressure control means wherein the differential between the cabin pressure and atmospheric pressure may be kept within predetermined upper limits.

It is an additional object to provide a system of cabin pressure control built up of relatively simple elements that may easily be manufactured and readily serviced.

It is a further object to provide a control device having altitude selecting means and rate control means which requires a minimum of connections to other control apparatus and to other portions of the plane.

It is also an object to provide means for controlling cabin pressure, and changes in cabin pressure, wherein the elements of the control apparatus may be grouped together as a compact whole, or may be distributed about the cabin as space demands require, the functioning of the apparatus being equally good in either instance.

It is a further object to provide electrical means for controlling cabin pressure and the rate of change of cabin pressure, so that the control equipment will be relatively insensitive to temperature variations and to extraneous pressures and, in the event of damage, may be safely repaired in flight.

These and other objects will be apparent upon a study of the following specification and drawings wherein:

Figure 1 is a schematic representation of the present control system as applied to an aircraft cabin.

Figure 2 is a perspective view showing the present altitude selector and its driving motor.

Figure 3 is a partial elevation showing the strain release means associated with said altitude selector.

As previously noted, the present invention relates to the control of air pressure in an aircraft cabin. Obviously, if the cabin is opened to the outside atmosphere, the pressure within the cabin will decrease as the altitude is increased. However, humans within the plane cannot adjust themselves to the altitudes commonly reached nor can they comfortably and safely stand the rate of pressure changes resulting from the rapid climbing and descending abilities of the modern aircraft. Means are in use wherein a portion of the air compressed by the turbo supercharger of an aircraft engine is supplied to the cabin in proper quantity and at a pressure exceeding that in the cabin. It is found, however, that the pressure of the air supplied by the turbo supercharger may not correspond to that desired in the cabin, hence, it is necessary to control the flow of air from the cabin to gain the pressure regulation desired. The present invention relates to means controlling the valve which controls the discharge flow, but it should be noted that the present control means may be used to operate other regulating devices in a similar manner.

In Figure 1, numerals 10, 11 and 12 denote portions of the cabin walls, it being noted that the control means herein disclosed will normally be located within the cabin. Air is normally supplied to the cabin through inlet 20 in wall 10 and discharged through outlet 13 in wall 11. Flow through discharge outlet 13 is controlled by a butterfly valve 14. This valve is actuated by gear train 15, which is driven by shaft 16 of motor 17. Motor 17 is of the reversible split phase type, being provided with a pair of field windings 22 and 23 which are 90 electrical degrees apart, and an armature 24. Field winding 22 is supplied with current from secondary 26 of transformer 27. The circuit for winding 22 is: upper terminal of secondary 26, wire 30, capacitor 31, wire 32, winding 22, and wire 33 back to the lower terminal of secondary 26. The current flow to winding 23 is controlled by amplifier 35, it being connected to said winding by wires 36 and 37. Amplifier 35 receives current from secondary 38 of transformer 27, it being connected to said secondary 38 by wires 39 and 40.

Amplifier 35 is provided with input terminals 43 and 44 and operates to supply field winding 23 of motor 17 with alternating current of a phase dependent upon the phase of an alternating signal potential impressed on said terminals 43 and 44. Any suitable amplifier having such characteristics may be used at 35, but preferably it should be of the sort described in a co-pending application, Serial No. 437,561, filed April 3, 1942, by Albert P. Upton, now Patent No. 2,423,534, issued July 8, 1947.

Secondary windings 26 and 38 of transformer 27 are energized by primary winding 50 which is supplied with alternating current from lines 51 and 52, the line current being obtained from an inverter, or other suitable source.

It is noted that if the winding 23 of motor 17 is supplied with alternating current which leads that supplied to winding 22 by 90 electrical degrees, armature 24 will rotate in one direction, while if the current supplied said winding 23 lags that supplied winding 22 by 90 electrical degrees, armature 24 will rotate in the other direction.

The signal potential impressed on terminals 43 and 44 of amplifier 35 is dependent on the electrical conditions existing in a compound system comprising two electrical networks connected in series. One of said networks and a portion of the other may be considered part of control device 60, this division being arbitrarily made for the purpose of this description. The circuit energizing terminals 43 and 44 may be traced as follows: terminal 43, wire 55, terminal 56 of control device 60, wire 57, electrical network 58, wire 61, electrical network 64, and wire 65 to terminal 44 of said amplifier.

Network 58 receives current from a transformer 70 having a primary winding 71 and a secondary winding 72. Primary winding 71 of transformer 70 is energized by the circuit: line 51, wire 80, terminal 81, wire 82, wire 83, primary winding 71, wire 84, wire 85, terminal 86, wire 87, and line 52. The terminals of said secondary winding 72 are connected to an impedance, potentiometer resistor 73 by wires 74 and 75. Also, wire 57 is connected to right-hand terminal 76 of said secondary winding. Wire 61 which connects networks 58 and 64, is connected at one end to slider 77, which coacts with resistor 73. The other end of wire 61 connects to slider 90, which coacts with another impedance, potentiometer resistor 91 of network 64.

Network 64 will be recognized as forming a conventional electrical bridge circuit having output through said slider 90 and through follow-up slider 92, which coacts with an additional impedance, potentiometer resistor 93. The input terminals 94 and 95 of said bridge network 64 are supplied with current by secondary winding 96 of transformer 97. One leg of the bridge is formed by the left-hand portion of resistor 91 and wire 99. Another leg comprises the right-hand portion of resistor 91 and wire 100. Still another leg comprises wire 101, terminal 102, wire 103, and the left-hand portion of resistor 93, while the remaining leg comprises wire 104, terminal 105, wire 106 and the right-hand portion of resistor 93.

Transformer 97 is energized by the circuit: line 51, wire 80, terminal 81, wire 82, wire 107, primary winding 98, wire 108, wire 85, terminal 86, wire 87, and line 52. If desired, transformers 70 and 97 may be combined so that a single primary winding serves the two secondary windings. Further, either one or both of transformers 70 and 97 may be similarly combined with transformer 27.

Slider 92 is operated by shaft 110 from gear train 15 in such a manner that it is driven to the right of resistor 93 as valve 14 is opened, and is driven to the left of said resistor when said valve is closed.

The cabin pressure is regulated in response to device 112 which comprises an evacuated bellows 113, said bellows containing spring means to extend same. Bellows 113 operates slider 90, said slider being held in contact with same by adjustable spring means 114. As shown, spring 114 is adapted to be adjusted by screw threaded means 115. Obviously, any suitable pressure responsive means may be used to operate slider 90. Device 112 is usually adjusted so that slider 90 is at the extreme right of resistor 91 when the cabin pressure is at the maximum desired. As the cabin pressure diminishes, slider 90 moves to the left. The effect of the operation of device 112 will be more fully explained in the operation portion of this disclosure.

The control point, or cabin pressure, which it is desired that device 112 will attempt to maintain, is regulated by slider 77 coacting with resistor 73. If manual regulation of cabin pressure would be satisfactory, slider 73 might be operated by a control knob or the like. However, as previously pointed out, it is also desired that the rate at which the cabin pressure is adjusted be properly regulated.

To provide manually adjustable automatic rate control means for adjusting the cabin pressure, slider 77 is adjusted by means which I prefer to call an altitude selector and the speed of adjustment of slider 77 is regulated by what I call a rate control. Obviously, these names are only suggestive and are herein used for convenience. Instead of altitude selector, cabin pressure selector is equally descriptive but, as airmen commonly think of air pressure in terms of altitude, the preferred name seems proper.

As schematically shown in Figure 1, and as shown in the perspective of Figure 2, slider 77 is adjusted along resistor 73 only by reversible and variable speed motor 120 driving through gear train 121 and shaft 122. As will be noted, the direction and amount of rotation of motor 120 will determine the adjustment of slider 77 and the speed of the motor will determine the rate of change of adjustment of said slider 77. Altitude selector knob 125 adjusts chaser switch means 126 through shaft 127. The chaser switch means comprises a pair of switch blades 128 and 129, insulated from each other, and having contacts 130 and 131, respectively, said blades being carried by shaft 122. In Figure 2, it is noted that the blades 128 and 129 are rigid and are operatively connected to shaft 122 by spring strain release means. Figure 3 shows in elevation the strain release means of Figure 2. Support arms 228, which carry blade 128, and support arms 229, which carry blade 129 are freely pivoted on shaft 122. Stop means 230, attached to shaft 122, extends between the arms 228 and 229 and limits the rotation of said arms toward each other but permits said shaft to rotate one arm or the other. Spring 231 urges said arms together and against said stop and cooperates with said stop to form strain release means. Because of the difficulty in schematically showing this feature, blades 128 and 129 in Figure 1 are considered flexible. In cooperative and opposing relation to these switch blades, are blades 132 and 133 carrying contacts 134 and 135, respectively. Blades 132 and 133 are also insulated from each other and are carried by shaft 127. Sufficient friction is provided in the bearings for shaft 127, or otherwise, to retain said shaft 127 in an adjusted position against the rotative effect due to the aforesaid strain release means. The present chaser switch is considered as illustrative only, for any suitable switch that performs the same switching action as switch 126 is suitable.

In the position shown, none of the switch contacts is in engagement. Upon rotating knob 125 to the left, where it will stay due to friction, contacts 134 and 130 will engage and blade 128 will be forced to the left an amount corresponding to the adjustment of the knob, this being permitted by the strain release means. The engagement of contacts 134 and 130 causes the energization of one of the field windings of motor 120 by the following circuit: battery 146, wire 147, terminal 148, wire 149, wire 150, switch arm 151 of limit device 160, contact 152, wire 153 blade 132, contact 134, contact 130, blade 128, wire 136, field winding 137, wire 138, wire 139, manual switch 140, wire 141, terminal 142, wire 143, terminal 144, wire 145, and battery 146. As contacts 130 and 134 are in engagement, the circuit through the field winding is complete and the motor rotates in a direction to drive slider 77 to the right, this action of the motor continuing until contacts 130 and 134 separate and break the circuit.

The armature 154 of motor 120 is energized as long as manual switch 140 is closed, the circuit being: battery 146, wire 147, terminal 148, wire 149, wire 155, armature 154, wire 156, resistor 157, of rate control 161, slider 158 of said control 161, wire 159, wire 139, manual switch 140, wire 141, terminal 142, wire 143, terminal 144, wire 145, and battery 146. By varying knob 162 of the rate control 161, and thereby the armature current of motor 120, the speed of said motor is varied, and thus the rate at which said slider 77 is adjusted is regulated.

If desired, wire 143 may be eliminated and connections made to terminals 142 and 144 through air ram switch, or other such device, which closes when the aircraft is in forward motion. With a switch of this sort, altitude selector knob 125 and the knob 162 of rate control 161 may be adjusted as desired sometime before the plane is ready to take off. However, motor 120 will not be energized to start controlling cabin pressure until the aircraft has actually started its flight.

Rotation of knob 125 to the right, to provide for higher altitude, or less cabin pressure, engages contacts 135 and 131 and energizes motor 120 to run in a reverse direction from previously, the circuit being: battery 146, wire 147, terminal 148, wire 149, wire 168, arm 169, contact 170, of limit device 172, wire 171, blade 133, contact 135, contact 131, blade 129, wire 165, field winding 166, wire 169, wire 139, manual switch 140, wire 141, terminal 142, wire 143, terminal 144, wire 145, and battery 146. Contacts 135 and 131 being in engagement, and assuming limit device 172 has its contact 170 engaged, motor 120 is energized to drive slider 77 to the left across resistor 73.

Limit device 160 comprises a pivoted arm 151 operating between contacts 152 and 175, said arm being moved by bellows 176, said bellows containing a spring 177. Spring 178 keeps arm 151 in contact with said bellows. Cabin pressure causes said bellows to retract and atmospheric pressure and spring 177 causes said bellows to expand. Adjustment may be made through either spring 178 or spring 177. The interior of bellows 176 communicates with the atmosphere through tubes 179 and 180, tube 180 extending through cabin wall 12. If desired, tube 180 may be connected to the static air line of the plane's air speed indicator, if desired, or to any other source of air at atmospheric pressure.

Device 160 is adjusted to maintain arm 151 in contact with contact 152 unless the cabin pressure rises an undue amount over atmospheric pressure. This limits the stress that can be put on the cabin due to cabin pressure. Should the cabin pressure continue to rise after arm 151 has broken contact with 152, said arm makes contact with 175 and energizes motor 120 by the circuit: battery 146, wire 147, terminal 148, wire 149, wire 150, arm 151, contact 175, wire 181, winding 166, wire 169, wire 139, manual switch 140, wire 141, terminal 142, wire 143, terminal 144, wire 145, and battery 146. It is noted that the motor is thus energized to drive slider 77 to the left and thus cause a reduction in cabin pressure. A suitable limit of differential pressure to which device 160 is adjusted is a cabin pressure of 3.35 pounds per square inch above atmospheric pressure. This corresponds to a pressure of about 6.8 inches of mercury.

While the differential of cabin pressure over atmospheric pressure can be permitted to rise to a predetermined amount, such as 3.35 pounds per square inch, proper control of the cabin pressure becomes difficult as the differential of cabin pressure over atmospheric pressure approaches zero. For this reason, and to minimize manual manipulation of the controls, limit device 172 is provided.

Device 172 comprises a bellows 182 containing a spring 183. As before, cabin pressure tends to collapse bellows 182, and spring 183 plus atmospheric pressure tends to extend said bellows. Spring 184 is used to keep arm 169 of said device in contact with bellows 182 and may be used for adjustment. Bellows 182 is connected to the atmosphere through tubes 185 and 180. Device 172 is so adjusted that arm 169 is raised off contact 170 as said differential pressure drops to a predetermined value such as ½ inch of mercury. Obviously, the values given for the present limit devices are illustrative only and are not to be taken in a limiting sense. With contact broken between arm 169 and contact 170, motor 120 cannot be energized by the altitude selector in a manner to reduce cabin pressure. In addition to the contact mentioned, a second contact 190 is arranged to be engaged by arm 169 when the differential of cabin pressure over atmospheric pressure diminishes to ¼ inch of mercury. Contact 190 controls signal light 191 by the circuit: battery 146, wire 147, terminal 148, wire 149, wire 168, arm 169, contact 190, wire 192, signal light 191, wire 193, wire 139, manual switch 140, wire 141, terminal 142, wire 143, terminal 144, wire 145, and battery 146. The practical value of these limit devices will be further shown in the following description of the operation of the present system.

The present apparatus may be combined to a considerable extent in a unitary control panel such as 60, shown dotted in Figure 1, if space permits. By consolidating the altitude control, rate control, cabin pressure responsive device, manual switch and the limit devices in the manner shown, a minimum of electrical and piping connections with other parts of the airplane are required. However, as the aircraft instrument panels are frequently very crowded, spaced limitations for the present panel may be so strict as to permit only the altitude selector and rate control in panel 60, the other devices being distributed about the cabin in suitable location. It is one of the salient features of the present system that the apparatus used may be grouped together, or distributed in other parts of the aircraft, without affecting the excellence of the control afforded.

The present grouping of equipment is to be considered illustrative only, for other arrangements may be equally suitable.

*Operation*

While the apparatus used in the present system, and the function of same, has been described, it is believed that a better appreciation of the present invention may be had by reciting its function and describing its operation under hypothetical flight conditions.

To make this description of operation more concrete, certain assumptions may be made. As before noted, air is supplied to the cabin under a pressure exceeding that of the cabin and in an amount controlled to satisfy the needs of cabin ventilation. The air is discharged through outlet 13 under control of valve 14, and it may be assumed that valve 14 must be partly closed to raise the cabin pressure more than about ¼ inch of mercury above that of the outside atmosphere. The scale of the altitude selector may be considered as extending from 0 feet to 20,000 feet, it being noted that this scale may also refer to the pressures corresponding to said altitudes.

The rate control may be calibrated from zero to 800 feet per minute change in altitude, or, in other words, the pressure in the cabin may be varied at rates corresponding to changes in altitude up to 800 feet per minute.

Limit device 160 may be adjusted to prevent cabin pressure from rising more than 3.35 pounds per square inch, or about 6.8 inches of mercury, above atmospheric pressure. Limit device 172 may be adjusted to open one set of contacts whenever cabin pressure is less than ¼ inch of mercury over atmospheric pressure and to energize signal light 191 when cabin pressure is the same as atmospheric pressure.

Cabin pressure responsive device 112 may be adjusted so that slider 90 is at the extreme right of resistor 91 at sea level pressure, or zero altitude. Further, it may be considered that knob 125 is adjusted to zero altitude, and slider 77 is at the extreme right of resistor 73. Considering valve 14 to be open, then slider 92 is at the right-hand end of resistor 93.

As previously related, motor 17, which operates valve 14, has its winding 22 constantly energized, but cannot operate unless winding 23 is also energized. Further, the direction of rotation of said motor depends upon the phase relation of the current supplied winding 23 relative to the current supplied winding 22.

To determine whether or not current is being supplied winding 23, the electrical networks which supply the signal potential to amplifier 35 may now be considered. To expedite the consideration of the networks, assume that transformers 70 and 97 supply each of their respective secondaries 72 and 96 with 24 volts of alternating current. Also, assume that resistors 73, 91 and 93 are of suitable value. It has been stated that the networks are supplied with alternating current but for the purpose of this analysis, the operation will be considered for a half-cycle in which the left-hand terminals of the networks are negative and the right-hand terminals are positive in potential. Further, the voltage drop from one side of the networks to the other being 24 volts, the voltage at any point of a resistor is assumed to be in linear relation to the position of the slider. For instance, if a slider be halfway across a resistor, the voltage at said slider will be 12 volts.

It is noted that the cabin pressure, although air is supplied the cabin under pressure, will approximate atmospheric pressure as the aircraft rises and descends, if valve 14 be left wide open. Thus, if the pressure in the cabin is to be increased relative to atmospheric pressure, valve 14 must be at least partially closed. Device 112 responds to cabin pressure and attempts to hold said pressure uniform. To do this, it is obvious that an increase in cabin pressure should open valve 14 and a decrease should close same. Thus movement of slider 90 to the left will tend to drive valve 14 closed. While the aircraft cabin may be supercharged at higher elevations, the pressure maintained, while above atmospheric pressure at said elevations, is less than the sea level pressure for which device 112 may be set. Thus, to adjust the cabin pressure to a higher elevation, such as 10,000 feet, by the altitude selector, it is apparent that the controlling effect of device 112 must be offset in a manner to permit the cabin pressure to decrease. Therefore, movement of slider 77 of the altitude selector to the left causes valve 14 to open and thus decrease the pressure in the cabin. Considering the system as a whole, valve 14 is actuated by the combined effects of the movements of sliders 77 and 90, and the system is rebalanced by follow-up slider 92, driven in conjunction with valve 14.

With the parts in the position described, with slider 92 at its right-hand extreme, slider 90 at its extreme right, and slider 77 at its extreme right, it is noted that slider 90 is at the same potential as slider 92. Slider 77 is at the same potential as slider 90, and, as terminal 76 is a right-hand terminal of network 58, it, too, is at the same potential as slider 77. With sliders 92, 90 and 77, and terminal 76 all at the same voltage, the potential difference between slider 92 and terminal 76 is zero. As terminal 76 is connected to terminal 43 of amplifier 35 and slider 92 is connected to terminal 44 of said amplifier, no input voltage is applied to the amplifier. As a result, no current is supplied winding 23. The system is thus in equilibrium. Further, as knob 125 is adjusted to zero position, and as slider 77 is at its extreme right, the contacts of chaser switch 126 are separated and motor 120 is inactive.

With a flight about to begin, knob 125 may be adjusted to 10,000 feet altitude and rate control knob 162 may be adjusted for 400′ per minute change, these adjustments being made as the plane is about to leave the field. Of course, by use of an automatic device, such as an air ram switch, the adjustments may be made at any time before starting the flight, but the equipment remains inactive until the air ram switch closes due to the flight being started, and thus energizes the control equipment. With knob 125 turned from zero to a 10,000 feet adjustment, contacts 131 and 135 are engaged and motor 120 starts operating at a rate sufficient to drive slider 77 to the left across resistor 73 corresponding to 400 feet change of altitude per minute. It may be considered that the aircraft is climbing at 800 feet per minute.

With slider 92 at the extreme right, slider 90 at the extreme right, and slider 77 starting to move leftward, the circuit conditions of the networks become unbalanced.

With the plane rising at 800 feet per minute, and as valve 14 was initially wide open, it is apparent that the cabin pressure will tend to change twice as fast as desired. However, as the cabin pressure decreases, device 112 responds to said decrease, slider 90 moves to the left, and valve 14 is driven toward closed position to attempt to maintain the cabin pressure constant. This controlling effect is partially overcome by the movement of slider 77 to the left which tends to open valve 14. Consider that slider 90 has moved to the left on resistor 91 an amount corresponding to 2 volts change, and that slider 77 has moved a distance across 73 corresponding to a one volt change. With slider 92 at the extreme right, slider 90 is 2 volts negative with respect to 92. Slider 77 is at the same potential as slider 90, and terminal 76 is one volt positive with respect to slider 77. Between terminal 76 and slider 92, a potential difference of one volt is thus seen to exist, slider 92, and terminal 44, being one volt positive with respect to 76, and terminal 43. Motor 17 is thus energized in a manner to cause a closing movement of valve 14. This causes slider 92 to move to the left. With slider 92 moved to the left on resistor 93 a distance corresponding to one volt change, then 90 is only one volt negative with respect to 92, slider 77 is also one volt negative with respect to 92, but terminal 76 is 1 volt positive with respect to 77. Therefore the voltage difference between 76 and 92 balances out and motor 17 stops. In practice, however, the networks may continually be unbalanced and rebalanced. For instance, instead of more or less sequential operation of sliders 77, 90 and 92 as just related, they actually move simultaneously. Device 112, as the plane rises, continually attempts to close valve 14, whereas the altitude selector, so long as slider 77 is being moved, continually attempts to open valve 14 and reduce cabin pressure. The result is a gradual closing of valve 14 as the plane rises, and, through slider 92, a continual rebalancing of the networks.

In beginning a flight, it is quite common for the pilot to make a fairly rapid climb to about 2,000 feet elevation and then level off for a short time to check the operation of his instruments, engines and the like, before continuing. Assuming that the plane was climbing at 800 feet per minute, this elevation would be reached in 2½ minutes. If the time of checking instruments and the like is five minutes, it will then be 7½ minutes before the plane rises above 2,000 feet elevation.

It was previously shown that cabin pressure responsive device 112 tends to lead the action of the other control device because of the tendency of the air pressure to vary faster than desired. Further, it was noted that valve 14 tended to be further closed as the airplane ascended although the cabin pressure was slowly being reduced. This reason for the gradual closing of the valve 14 is the pressure drop across the valve, and thus its flow rate, tends to change more rapidly than the cabin pressure.

However, as the craft levels off at 2000 foot elevation, the pressure drop across the valve starts to diminish and cabin pressure therefore tends to change at a lower rate. It is noted however that slider 77 is still advancing across 73 at its previous rate. To counteract the tendency of the cabin pressure to change at less than its desired rate, valve 14 must now be driven open. It was previously noted that movement of slider 90 to the left tended to close valve 14 whereas movement of slider 77 to the left tended to open same. Now, as slider 77 overtakes slider 90, valve 14 is driven open. To check, with slider 92 at the right, slider 90 at 3 volts negative with respect to 92, and slider 77 3 volts negative with respect to 76, there is seen to be no potential between 76 and 92 hence the system is in equilibrium.

With the cabin pressure now at approximately 2000 feet elevation, it is apparent that the pressure can be lowered no further even though slider 77 continues to advance to the left. The effect of this is to hold valve 14 wide open until device 112 once more takes control by slider 90 advancing beyond slider 77. However, assuming that the aircraft resumed its previous rate of climb after the five minutes of checking instruments, it is seen that slider 90 cannot overtake slider 77 until an elevation of about 4000 feet is reached. Therefore, with valve 14 held open by slider 77 for the last 2000 feet of climb, cabin pressure would change twice as fast as desired.

To prevent slider 77 assuming dominance over slider 90 as the plane ascends, limit device 172 is provided. As previously related, the current energizing winding 166 of motor 120 to drive slider 77 to the left passes through arm 169 and contact 170 of device 172. When cabin pressure drops to within about ¼ inch of mercury above atmospheric pressure, arm 169 separated from contact 170 by bellows 182 and the circuit is then broken. By opening the circuit energizing said winding 166, motor 120 and slider 77 is stopped, thereby preventing said slider 77 from moving appreciably beyond slider 90.

When the plane resumes its upward flight, device 112 assumes control, attempts to close valve 14, and thus increases the differential of cabin pressure to atmospheric pressure. This causes bellows 182 to contact, arm 169 engages contact 170 and slider 77 continues its travel across resistor 73.

Assume now that the airplane, after a period of time has reached an altitude of 15,000 feet and that the cabin pressure has been reduced to a point corresponding to a 10,000 foot elevation. As this is the elevation for which the altitude selector was adjusted, the contacts or chaser switch 126 are in neutral position and no circuit is made through same. Slider 77 is therefore stationary. With slider 77 stationary, when cabin pressure decreases sufficiently to drive slider 90 beyond 77, valve 14 is further closed and, when cabin pressure increases to drive slider 90 back of 77, valve 14 is further opened. Thus the position of slider 77 establishes a control point for device 112.

If the plane should now ascend to 35 000 feet without any adjustment being made of the altitude selector, it will be noted that the differential of cabin pressure over atmospheric pressure will tend to rise above the permissible 6.8 inches of Hg. However, as the differential of pressure approaches the aforesaid limit, device 160 is actuated by the excessive pressure differential forcing a partial contraction of bellows 176, resulting in arm 151 being forced away from contact 152 and into engagement with contact 175. When arm 151 contacts 175, winding 166 of motor 120 is energized in a manner previously related, this causing operation of slider 77 to the left to reduce cabin pressure. Thus, to protect the plane structure from excessive pressure, the cabin pressure may be lowered by limit device 160 without regard to the setting of knob 125. It is noted that when slider 77 is driven to the left by the action of device 160, engagement is made between contacts 134 and 130, but the circuit normally controlled by these contacts is now deenergized because contact 152 is out of engagement with arm 151. However, when the plane starts descending, and the differential pressure is decreased to below the adjusted setting of device 160, arm 151 makes engagement with contact 152. In making a circuit through arm 151 and contact 152, and with contacts 134 and 130 in engagement, it is noted that conditions are similar to those caused by turning knob 125 to the left for increasing cabin pressure. Thus winding 137 of motor 120 is energized and causes slider 177 to be moved to the right until the circuit is broken, such as by opening of contacts 134 and 130 due to slider 77 reaching a position for which knob 125 is adjusted.

With the airplane at a 15,000 foot elevation and the cabin pressure corresponding to a 10,000 foot elevation, consider that the flight is to end by landing at an airfield having an elevation of 3000 feet. Knob 125 of the altitude selector is turned to 3000 on the dial and, as the rate of pressure increase is more critical to humans than the rate of pressure decrease, knob 182 of the rate control may be adjusted to 300. Turning knob 125 from its previous setting of 10,000 to 3,000 causes engagement between contacts 130 and 134 of chaser switch 126. This energizes winding 137 of motor 120 and thus causes same to rotate in a direction to drive slider 77 to the right, thus resetting the control point of 112 and causing an increase in cabin pressure. This action is substantially the reverse of that described for the lowering of the cabin pressure as the plane ascended.

To change the cabin pressure from 10,000 feet elevation to 3,000 elevation at the rate of 300 feet per minute will be seen to require about 23 minutes. If the pilot adjusts the cabin pressure controls for a descent about 23 minutes before he expects to land, and then brings the airplane down at a reasonably uniform rate, the cabin pressure will be reduced to the 3000 foot value at the same time the plane lands. This is a correct procedure for landing an airplane having a pressurized cabin.

Should the cabin pressure controls be adjusted as above 30 minutes before the craft is to land, the cabin pressure will reach its adjusted level of 3000 feet in about 23 minutes as before. The cabin pressure will then remain constant until the airplane lands. Adjusting the cabin pressure controls for a landing sufficiently soon to give a little more than the required time for the cabin pressure change is probably the normal procedure. This gives the pilot more choice in landing time and does not interfere with correct functioning of the control apparatus.

Consider now that the cabin pressure controls are adjusted for the descent less than the aforesaid 23 minutes before the intended landing time and that the aircraft starts descending at 1,000 feet per minute. With the airplane descending at said rate, the differential of cabin pressure to atmospheric pressure diminishes hence cabin pressure tends to increase. This drives slider 90 to the right and thus causes opening of valve 14. However, slider 77 is moving to the right, thus tending to close the valve. With slider 77 establishing the control pressures which device 112 attempts to maintain, the cabin pressure is increased at the desired rate.

However, if the plane continues to the landing field at its initial rate of descent, it will land in 12 minutes after starting said descent. If the cabin pressure be increased at its prescribed rate, it will require about 23 minutes to properly adjust said pressure. Obviously, in the lower portion of the descent, atmospheric pressure will tend to exceed cabin pressure. This cannot happen, however, for air is constantly being admitted to said cabin under pressure, therefore the cabin pressure must be at least slightly above atmospheric pressure to permit said air to leave the cabin. Roughly, it is apparent that in about 7 minutes after starting the descent, the atmospheric pressure is approximately that of the cabin. Further, as valve 14 is opened by movement of slider 90 to the right in response to cabin pressure rise, the cabin pressure cannot be reduced to cause said slider 90 to move to the left because there is no means to reduce the pressure below atmospheric. Consequently, the networks remain unbalanced in a manner to hold valve 14 open and thus cabin pressure tends to follow atmospheric pressure for the rest of the descent.

When the differential of cabin pressure over atmospheric pressure diminishes to about ¼ inch of mercury, arm 169 is forced into engagement with contact 190 in a manner previously related. This energizes signal light 191 and advises the pilot to modify his rate of descent to no more than the permissible rate. It is thus seen that the cabin pressure of an aircraft can readily be controlled in a desired manner so long as said pressure is above the atmospheric pressure at the elevation of the airplane. When the cabin pressure of a descending plane reaches atmospheric pressure, the descent should be no faster than the prescribed rate; signal light 191 giving warning whenever the rate of descent must be slowed. Obviously, when the rate of descent is lower than prescribed, the cabin pressure will automatically be increased in the manner previously related.

In discussing the balancing of the present networks, the potential relations have been considered on a half-cycle basis. When considered in this manner, one side of the networks was considered positive in potential and the other side negative. However, the current supplied is alternating; therefore, there is no negative and positive side to the network. As the voltage relations previously discussed were correct for the half-cycle only, it is seen that in one sort of network unbalance, the instant voltage was higher at one terminal than at the other, whereas, under the other conditions of network unbalance, the voltage relations were reversed. In both cases, a signal potential was being given by the networks. Interpreting the present instant voltage relation in terms of alternating current, it now becomes apparent that an unbalance of the present network results in a signal potential varying in magnitude according to the degree of unbalance of the network, and varying in phase relation dependent on the direction of unbalance of said network. As an alternating current, which at one instant is one volt negative, is 180 electrical degrees later, one volt positive, it becomes clear that unbalance of the present networks in one direction gives signal potentials 180 degrees out of phase with signal potentials due to unbalance of said networks in the opposite direction. As previously related, the output current of amplifier 35 is in like phase relation to the input signal potentials. Therefore, when a signal potential is impressed on the input terminals of amplifier 35, winding 23 is energized and armature 24 is rotated, its direction of rotation being determined by the phase relation of the current impressed on said input terminals.

It is therefore seen that a series of electrical networks comprising potentiometers adjusted by control apparatus may be used to regulate the operation of a motor valve, or other such device, for regulating cabin pressure. Further, by using a reversible motor to adjust a potentiometer, excellent control of the rate of adjustment of said potentiometer may be affected. In addition, by including suitable limit devices in the control circuit of said potentiometer motor, pressure differentials may readily be kept within desired bounds.

Should the descent of the aircraft be sufficiently rapid, the atmospheric pressure may equal or exceed that in the cabin before the landing field is reached. Because the flight cannot be terminated until the cabin pressure is reduced to that of the landing field at the prescribed rate, a signal is given to warn the pilot to modify his rate of descent.

There is thus provided a simple, positive and sensitive apparatus for controlling the cabin pressure of an aircraft. Further, the present equipment is inherently dependable in nature and flexible in arrangement possibilities thereby making same highly suitable for its intended purpose. Because the equipment is electrical, it is very little affected by temperature, vibration, and the like. Additionally, because there are no conduits carrying high pressure fluid, damage to the system in flight presents a minimum of hazard.

While the present apparatus is shown to be ideally suited for its intended purpose of controlling aircraft cabin pressure, it is apparent that it may be also used for other control purposes. Especially, the regulation of a control device by variable speed motor means is believed generally useful. Therefore, the illustrations given of the present invention are not to be considered in a limiting sense and the scope of the present invention is to be determined only by the appended claims.

I claim as my invention:

1. In an aircraft having a cabin supplied with air under pressure and having a discharge outlet for said air, pressure control means for said cabin comprising, in combination, valve means for controlling air flow through said discharge outlet, reversible split phase motor means for operating said valve means, current supply means for one of the windings of said motor means, amplifier means for supplying current to the other winding of said motor means, circuit means including a plurality of electrical networks connected in series for supplying signal potentials to said amplifier means, one of said networks including an altitude selector potentiometer adapted to be adjusted to predetermined settings, cabin pressure responsive means, another of said networks including a potentiometer adjusted by said cabin pressure responsive means and also including a follow-up potentiometer, said follow-up potentiometer being adjusted in accordance with said valve means, reversible selector motor means for adjusting said selector potentiometer, a circuit means including selector switch means for causing operation of said selector motor until it adjusts said altitude selector potentiometer to a predetermined setting, rate control means comprising means for varying the speed of said selector motor and thus varying the rate of adjustment of said altitude selector potentiometer, and limit means including a first differential pressure responsive device to prevent operation of said selector motor in a direction to cause a decrease in the differential of cabin pressure over atmospheric pressure below a predetermined amount and a second differential pressure responsive means causing operation of said selector motor in said direction and preventing operation of said selector motor in the other direction when the differential of said cabin pressure over atmospheric pressure rises above a predetermined amount.

2. In an aircraft having a cabin supplied with air under pressure and having a discharge outlet for said air, pressure control means for said cabin comprising, in combination, valve means for controlling air flow through said discharge outlet, reversible motor means for operating said valve means, cabin pressure responsive means, circuit means for controlling operation of said motor means, said circuit means including an altitude selector impedance and a cabin pressure impedance, said cabin pressure impedance being adjustable by said cabin pressure responsive means, said circuit means controlling said motor operated valve means in a manner to maintain a pressure within said cabin determined by said altitude selector impedance, reversible selector motor means for adjusting said altitude selector impedance, manually adjustable selector switch means controlling the operation of said selector motor means to cause it to adjust said altitude selector impedance in accordance with an adjustment of said manually adjustable selector switch means, and means for adjusting the speed of said selector motor means so that the rate at which said altitude selector impedance is adjusted may be controlled.

3. In a control device, in combination, a potentiometer having an adjustable slider, reversible variable speed motor means for operating said slider, a manually adjustable selector means moveable to any of a plurality of positions, chaser switch means jointly operable by said selector means and said motor means, said chaser switch means controlling operation of said motor in such manner that said slider is adjusted to a position in accordance with the position of said selector means, and speed regulating means for controlling the rate at which said motor adjusts said slider.

4. In an aircraft cabin pressure control means, in combination, a pressure control potentiometer having an adjustable slider, reversible variable speed motor means for operating said slider, a manually adjustable selector means moveable to any of a plurality of positions, chaser switch means jointly operable by said selector means and said motor means, said chaser switch means controlling operation of said motor means in such manner that said slider is adjusted to a position in accordance with the position of said selector means, and speed regulating means for controlling the rate at which said motor means adjusts said slider, thereby controlling the rate at which cabin pressure can be varied by said control potentiometer.

5. In a control device, in combination, a potentiometer having a slider, a motor driven shaft having mounted thereon said slider, a first pair of spaced switch means pivotally mounted on said shaft, strain release means connecting said switch means to said shaft in such manner that said switch means normally tend to rotate with said shaft but each may be rotated independently of said shaft by suitable means, and a manually rotatable shaft in substantial alignment with said motor driven shaft, friction means retarding rotation of said manually rotatable shaft with a comparably greater force than is exerted by said strain release means, a second pair of spaced-apart switch means fixedly mounted on said manually rotatable shaft and extending between and in engageable relation with the first-named pair of spaced switch means, said second switch means normally being spaced from said first named switch means but arranged to operate one or the other of said first named switch means upon rotation of said manually rotatable shaft.

6. Cabin pressure control apparatus comprising, in combination, electrical network circuit means, means for adjusting said circuit means including cabin pressure responsive means and cabin pressure selector means, said selector means including a manually adjustable chaser means and a cooperating motor actuated chaser means, means connecting said chaser means to said motor for effectively adjusting said selector means in accordance with said manually adjustable chaser means but at a lesser rate of change of adjustment, and means for controlling the rate of adjustment of said selector means.

7. Control apparatus for aircraft comprising, in combination, means for varying pressure in an aircraft, means for controlling the said pressure, differential pressure responsive means, switch means operable by said differential pressure responsive means, said switch means including a first set of contacts engageable only when the said differential pressure is above a predetermined high value, a second set of contacts engageable at all values of differential pressure below a value slightly lower than said high value and a third set of contacts engageable only at differential pressures above a predetermined low value, and means connecting said switch means in controlling relation to said varying means in such manner that engagement of said first set of contacts causes a reduction in differential pressure, engagement of said second set of contacts permitting normal control of said varying means and opening of said third set of contacts prevents a reduction of said pressure in the aircraft.

8. Control apparatus for pressure varying means of a pressurized aircraft cabin including means responsive to cabin pressure, means including said cabin pressure responsive means for controlling said varying means, means including a motor for adjusting said controlling means, and means including switching means operable in response to a predetermined differential of cabin pressure to atmospheric pressure connected in controlling relation to said motor for defining a limit of operation of said adjusting means.

9. Control apparatus for the pressure varying means of a pressurized aircraft cabin comprising, means responsive to cabin pressure, means including said cabin pressure responsive means for controlling said varying means, means for adjusting said controlling means, means responsive to the differential of cabin pressure to atmospheric pressure, and means connecting said differential pressure responsive means to said adjusting means in a manner to prevent operation of said adjusting means in a direction to increase said differential pressure.

10. Aircraft cabin pressure control apparatus comprising, a valve for controlling air flow through said cabin, motor means for operating said valve, a manually operable selector means including part of a chaser switch means, motor operated switch means for completing said chaser switch means and including a reversible motor means, electrical impedance means arranged to be adjusted by said reversible motor means, means connecting said impedance means in controlling relation to said first named motor means, differential pressure responsive switch means, and means connecting said differential pressure responsive switch means and said selector switch means in controlling relation to the second named motor means so that said impedance means may be adjusted in a direction and to an extent determined by said chaser switch means and may be adjusted only when permitted by said differential pressure responsive switch means.

11. Aircraft cabin pressure control apparatus including air flow control means for varying the air pressure in said cabin, motor means for actuating said flow control means, cabin pressure responsive means for controlling said motor means in a manner to maintain desired pressure conditions in said cabin, means for adjusting said pressure responsive means, and means responsive to a predetermined low differential of cabin pressure and atmospheric pressure for controlling the operation of said adjusting means, said differential pressure responsive means being constructed and arranged to prevent operation of said adjusting means in a manner to reduce the cabin pressure when the differential pressure reaches a predetermined low value.

12. Aircraft cabin pressure control apparatus including air flow control means for varying the air pressure in said cabin, motor means for actuating said flow control means, pressure responsive means for controlling said motor means in a manner to maintain desired pressure conditions in said cabin, switch controlled means for adjusting said pressure responsive means, means responsive to the differential of cabin pressure and atmospheric pressure, said differential pressure responsive means including switching means operable at a predetermined low differential pressure and at a relatively high differential pressure, and means connecting said switching means in controlling relation to said adjusting means in such a manner that said adjusting means cannot adjust said pressure responsive means to reduce the cabin pressure when the differential pressure is below said low value nor to increase the cabin pressure when said differential pressure exceeds said high value.

13. In an aircraft having a cabin supplied with air under pressure, apparatus for controlling the air pressure within said cabin, means responsive to cabin pressure for regulating said apparatus in a manner to maintain a predetermined pressure, adjustable selector means connected in controlling relation to said cabin pressure responsive means for determining the pressure to be maintained, said selector means including a manually adjustable chaser means and a cooperating motor adjusted chaser means, means connecting said chaser means in controlling relation to said motor, speed regulating means connected in controlling relation to said motor for controlling the effective rate of adjustment of said selector means, and means responsive to the differential of cabin pressure to atmospheric pressure also connected in controlling relation to said motor for controlling the adjusting of said selector means in a manner to limit said differential pressure to predetermined values.

14. Control apparatus for pressure varying means of a pressurized aircraft cabin including means responsive to cabin pressure, means including said cabin pressure responsive means for controlling said varying means, manually controlled motor means for adjusting said controlling means, and means responsive to the differential of cabin pressure to atmospheric pressure connected to said motor means for preventing operation of said motor means when said differential pressure exceeds predetermined limits.

15. Aircraft cabin pressure control apparatus including airflow control means for varying the air pressure in said cabin, motor means for actuating said flow control means, cabin pressure responsive means for controlling said motor means in a manner to maintain desired pressure conditions in said cabin, power operated means for adjusting said pressure responsive means, means responsive to the differential of cabin pressure and atmospheric pressure, said differential pressure responsive means including switching means operable at a predetermined low differential pressure, signal means, and circuit means connecting said switching means to said power operated means and to said signal means in such a manner that said signal means is energized and adjustment of said cabin pressure responsive means to a lower value of cabin pressure is prevented when said differential pressure reaches a predetermined low value.

ALBERT E. BAAK.

REFERENCES CITED

The following references are of record in the file of this patent:

UNITED STATES PATENTS

| Number | Name | Date |
|---|---|---|
| 387,714 | Fiske | Aug. 14, 1888 |
| 1,713,833 | Kochendorfer | May 21, 1929 |
| 1,832,809 | Hudson | Nov. 17, 1931 |
| 1,986,613 | Warren | Jan. 1, 1935 |
| 2,109,215 | Harder | Feb. 22, 1938 |
| 2,194,749 | Gregg | Mar. 26, 1940 |
| 2,208,554 | Price | July 16, 1940 |
| 2,208,784 | Armstrong | July 23, 1940 |
| 2,265,461 | Wagner | Dec. 9, 1941 |
| 2,299,199 | Wood | Oct. 20, 1942 |
| 2,307,199 | Cooper | Jan. 5, 1943 |
| 2,332,288 | Zeitlin | Oct. 19, 1943 |
| 2,353,201 | Talbot | July 11, 1944 |
| 2,419,707 | Cooper et al. | Apr. 29, 1947 |
| 2,424,491 | Morris | July 22, 1947 |
| 2,450,881 | Cooper et al. | Oct. 12, 1948 |
| 2,451,608 | Borell | Oct. 19, 1948 |

FOREIGN PATENTS

| Number | Country | Date |
|---|---|---|
| 466,281 | Great Britain | May 26, 1937 |
| 521,623 | Great Britain | May 27, 1940 |